(12) United States Patent
Schuster (10) Patent No.: US 10,591,386 B2
(45) Date of Patent: Mar. 17, 2020

(54) DEW POINT ACTIVATION METHOD FOR EXHUAST GAS SENSORS

(71) Applicant: Continental Automotive Systems, Inc., Auburn Hills, MI (US)

(72) Inventor: John Patrick Schuster, Grayslake, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 150 days.

(21) Appl. No.: 15/617,565

(22) Filed: Jun. 8, 2017

(65) Prior Publication Data

US 2018/0172553 A1 Jun. 21, 2018

Related U.S. Application Data

(60) Provisional application No. 62/435,298, filed on Dec. 16, 2016.

(51) Int. Cl.
| | |
|---|---|
| *G01M 15/10* | (2006.01) |
| *F01N 11/00* | (2006.01) |
| *F01N 3/20* | (2006.01) |
| *F01N 3/10* | (2006.01) |
| *F01N 3/021* | (2006.01) |

(52) U.S. Cl.
CPC ......... *G01M 15/102* (2013.01); *F01N 3/2066* (2013.01); *F01N 11/00* (2013.01); *F01N 3/021* (2013.01); *F01N 3/10* (2013.01); *F01N 2560/026* (2013.01); *F01N 2560/028* (2013.01); *F01N 2560/05* (2013.01); *F01N 2900/1402* (2013.01); *F01N 2900/1628* (2013.01); *Y02A 50/2325* (2018.01); *Y02T 10/24* (2013.01); *Y02T 10/47* (2013.01)

(58) Field of Classification Search
CPC .... G01M 15/102; F01N 3/2066; F01N 11/00; F01N 2560/05; F01N 2900/1628; F01N 2900/1402; F01N 3/021; F01N 2560/028; F01N 2560/026; F01N 3/10; Y02T 10/24; Y02T 10/47; Y02A 50/2325
See application file for complete search history.

(56) References Cited

U.S. PATENT DOCUMENTS

| 8,769,929 | B2 * | 7/2014 | Weber | B01D 53/30 |
| | | | | 60/276 |
| 9,846,110 | B2 * | 12/2017 | Tylutki | G01N 15/0656 |

(Continued)

FOREIGN PATENT DOCUMENTS

DE 102011086148 A1 5/2013

*Primary Examiner* — Freddie Kirkland, III (57) ABSTRACT

An emission control system, such as an emission control system for a diesel engine, which includes both a NOx sensor and an electrostatic Particulate Matter (ePM) sensor, and uses the signal from the ePM sensor to determine when it is safe to activate and heat up the NOx sensor after engine ignition. This is performed as soon as moisture clears the exhaust, without having to wait any additional time as a safety factor to maximize the reliability of the NOx sensor against damage from water thermal shock. It also allows for a higher degree of application flexibility for a specific engine and aftertreatment combination to be used in a variety of vehicle applications, environmental conditions, and vehicle operating profiles.

16 Claims, 6 Drawing Sheets

(56) References Cited

U.S. PATENT DOCUMENTS

| | | | | |
|---|---|---|---|---|
| 2010/0257846 A1* | 10/2010 | Weber | ............ | B01D 53/30 |
| | | | | 60/286 |
| 2012/0330539 A1* | 12/2012 | Weber | ............ | B01D 53/30 |
| | | | | 701/113 |
| 2015/0300277 A1* | 10/2015 | Stenl S | ......... | F02D 41/1444 |
| | | | | 701/110 |
| 2016/0356693 A1* | 12/2016 | Tylutki | ......... | G01N 15/0656 |
| 2017/0241321 A1* | 8/2017 | Yoo | ............ | F01N 11/00 |

* cited by examiner

DEW POINT ACTIVATION METHOD FOR EXHUAST GAS SENSORS

CROSS-REFERENCE TO RELATED APPLICATIONS

This application claims the benefit of U.S. Provisional Application No. 62/435,298 filed Dec. 16, 2016. The disclosure of the above application is incorporated herein by reference.

FIELD OF THE INVENTION

The invention relates generally to an emission control system, such as an emission control system for a diesel engine, which includes both a NOx sensor and an electrostatic Particulate Matter (ePM) sensor, and uses the signal from the ePM sensor to determine when to activate the NOx sensor after engine ignition to reduce or eliminate the risk of thermal shock.

BACKGROUND OF THE INVENTION

One of the most common field failure modes for nitric oxide (NOx) sensors is cracking of the ceramic sensor element due to thermal shock caused by impingement of water droplets on the element. This failure mode is catastrophic, causes the emission control system to fail, and sets an on-board diagnostic code that requires the vehicle to be serviced. This often occurs early in the vehicle life, and thus incurs significant warranty cost and customer dissatisfaction. It is also a possible failure mode for Oxygen, Hydrocarbon, or Particulate Matter sensors which use a ceramic sensor element, and are used in the exhaust system.

In the case where a NOx sensor is used in an exhaust system, the greatest risk of failure of the sensor typically occurs during cold start when clouds of water vapor in the exhaust gas condense and travel through the exhaust pipe and impact the sensors and other exhaust system components. Because the NOx sensor is heated to a high temperature (approximately 800° C.) to optimize its operation, any water impact on the hot ceramic sensor element may present a risk of thermal shock, which may damage and cause the sensor element to fail. The risk may be amplified when the vehicle is operated in cold ambient temperatures. Because a large fraction of the regulated and harmful exhaust gas emissions occur during cold start, it is considered desirable to activate the NOx sensor as soon as possible to facilitate control of the emissions, but it is also considered desirable to prolong activating the sensor a significant amount of time until water has cleared the exhaust system to reduce risk of failure.

This situation is typically addressed during the development of the vehicle engine control and exhaust aftertreatment control system. Application studies are performed on a vehicle or engine which attempt to replicate the environment and application that the sensor is used in over most operating conditions. Measurements are taken on the engine or vehicle to assess how various sensors on the end-use application vehicle may be used to predict when any water in an exhaust gas system has been eliminated. This may include temperature measurements, along with visual observation via remote camera to determine if water is present in the system. A model is then developed for an engine and aftertreatment control algorithm that uses on-board sensors and other information to predict when water in the exhaust system is most likely to be eliminated, and thus minimize risk to the NOx sensor. However, it is not possible to predict and replicate 100% of all possible conditions in testing that the sensor may be exposed to in various driving conditions; therefore there is always some degree of risk of failure of the sensor. This type of risk may be increased in the situation where the sensor is sold to an engine or exhaust system supplier, who then provides their system to an OEM, or end user, such as a vehicle manufacturer. The supplier does not necessarily always know, or have control over, the applications where their exhaust system, which includes the NOx sensor, may be used.

Thus, there is value in providing a system, method, or component which may directly detect the presence of water in the exhaust system so that the NOx sensor is not exposed to thermal shock after activation, and placed at risk of failure. However, current systems which have these features also must provide some margin of error, and typically may wait longer than necessary before activating the NOx sensor. After the sensor is sold to a vehicle manufacturer, it may not be possible to determine what all of the end-user applications will be, or all of the environments in which the NOx sensor may be used.

Accordingly, there exists a need for a more accurate water detection method, such that the NOx sensor may be used as part of any type of exhaust system, and activated as soon as it is safe to do so, the emissions control system may engage, and cold start exhaust emissions are reduced as much as possible without risking failure of the sensor.

SUMMARY OF THE INVENTION

This proposed method of the present invention optimizes the design trade-off between emissions control performance and component reliability risk.

In one embodiment of the invention, an emission control system, such as an emission control system for a diesel engine, which includes both a nitric oxide (NOx) sensor and an electrostatic Particulate Matter (ePM) sensor, and uses the signal from the ePM sensor to determine when it is safe to activate and heat up the NOx sensor after engine ignition. In one embodiment, this is performed as soon as moisture clears the exhaust, without having to wait any additional time as a safety factor to maximize the reliability of the NOx sensor against damage as a result of water thermal shock. It also allows for a higher degree of application flexibility for a specific engine and aftertreatment combination to be used in a variety of vehicle applications, environmental conditions, and vehicle operating profiles.

In one embodiment, the present invention is a combined system with both ePM and NOx sensors, linking the signal from the ePM to a control module which signals the activation of the NOx sensor after moisture has cleared the exhaust.

In an embodiment, the present invention is a method for determining when to activate a sensor. More specifically, an exhaust system for a vehicle includes a first sensor which is part of the exhaust system, and a second sensor, which is also part of the exhaust system. A measured current generated by the first sensor is used to detect the presence of a substance in the exhaust system. The presence of the substance is detected in the exhaust system if the current generated by the first sensor is above a predetermined value, which is typically when the current generated by first sensor is zero, or within some measurable threshold, typically approaching a zero threshold. To prevent the second sensor from being exposed to thermal shock, the second sensor is activated once the current measured by the first sensor is at or below the predetermined value.

In one embodiment, the first sensor is an ePM sensor, which generates current above the predetermined value when the substance is in the exhaust system. The second sensor is a NOx sensor, which is not activated until the current measured by the first sensor is at or below the predetermined value, so as to prevent the NOx sensor from undergoing thermal shock.

The substance is moisture, typically in the form of water, and the NOx sensor is activated once the current measured by the first sensor is at or below the predetermined value, indicating that the water has evaporated from the exhaust system.

In one embodiment, an exhaust pipe is part of the exhaust system, such that at least a portion of the first sensor extends into the exhaust pipe, and at least a portion of the second sensor extends into the exhaust pipe. The first sensor and the second sensor may be mounted to a tail pipe, but it is within the scope of the invention that the first sensor and the second sensor may be mounted to other portions of the exhaust pipe as well.

In another embodiment, an exhaust gas catalyst is part of the exhaust system, and the first sensor and the second sensor are mounted in proximity to the exhaust gas catalyst.

In yet another embodiment, an exhaust gas filter is part of the exhaust system, and the first sensor and the second sensor are mounted in proximity to the exhaust gas filter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
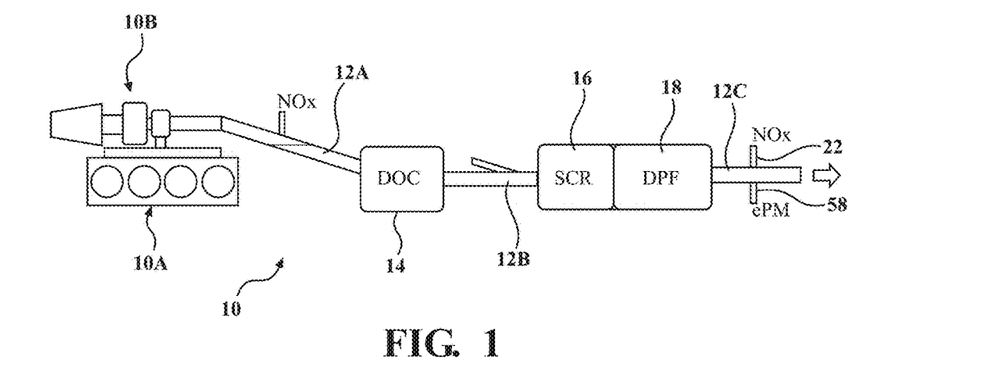
FIG. 1 is a diagram of an exhaust system for a vehicle incorporating a dew point activation method for an exhaust sensor, according to embodiments of the present invention.

An example of an exhaust system incorporating NOx sensor activation according to the present invention is shown in FIG. 1, generally at 10. The system 10 includes an engine, shown generally at 10A, which generates exhaust gas, and connected to the engine 10A is a turbocharger unit, shown generally at 10B. A front exhaust pipe 12A is connected to, and in fluid communication with, the turbocharger unit 10B, and a diesel oxidation catalyst (DOC) 14 is connected to, and in fluid communication with, the front exhaust pipe 12A. Connected to and in fluid communication with the DOC 14 is a mid-pipe 12B, and also connected to and in fluid communication with the mid-pipe 12B is a selective catalytic reduction (SCR) catalyst 16. Connected to the SCR catalyst 16 is a diesel particle filter (DPF) 18. Connected to and in fluid communication with the DPF 18 is a tail pipe 12C, from which exhaust gas exits the exhaust system 10. The SCR catalyst 16 and the (DPF) 18 are part of an SCR system, used for reducing exhaust gas emissions.

Figure 4A:
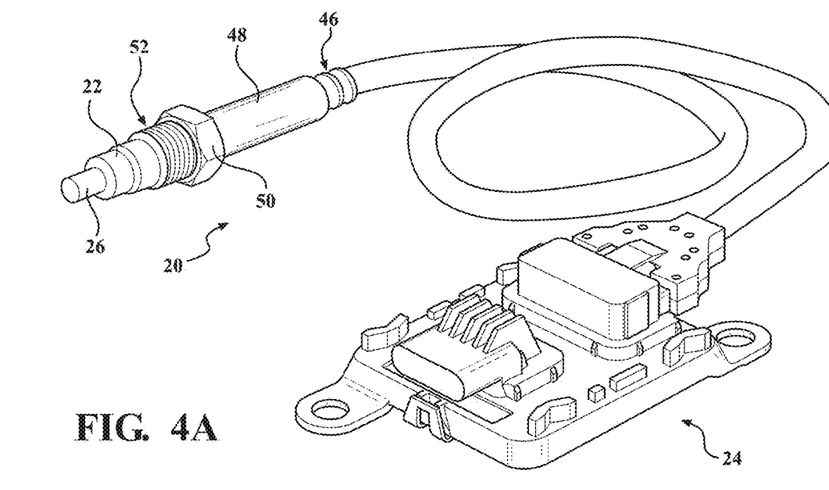
FIG. 4A is a perspective view of a nitrogen oxide sensor assembly used as part of an exhaust system for a vehicle incorporating a dew point activation method for an exhaust sensor, according to embodiments of the present invention.
Figure 4B:
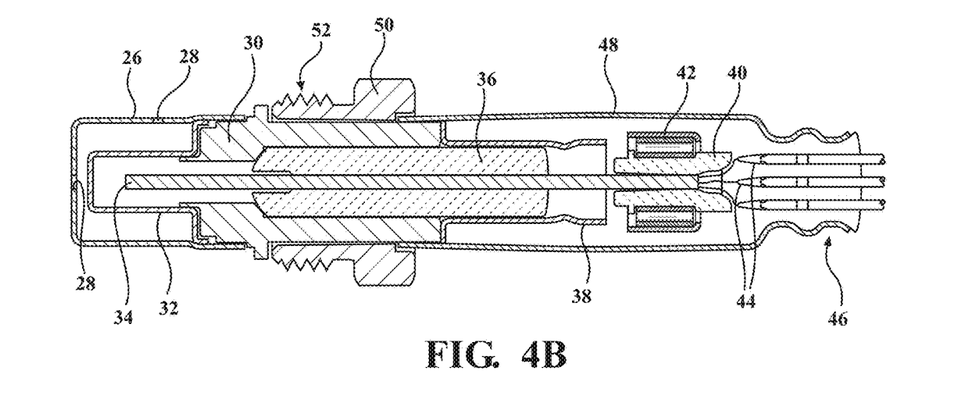
FIG. 4B is a sectional view of a sensor component which is part of a nitrogen oxide sensor used as part of an exhaust system for a vehicle incorporating a dew point activation method for an exhaust sensor, according to embodiments of the present invention.

Referring to FIGS. 4A-4B, the system 10 also includes a nitrogen oxide sensor, or NOx sensor, shown generally at 20, having a sensor component 22 connected to a control unit, shown generally at 24, where the control unit 24 is in electrical communication with another controller, such as an engine control unit (ECU), not shown. The sensor component 22 includes a first housing portion 26 having several apertures 28, and the first housing portion 26 is connected to a base portion 30. Also connected to the base portion 30 is an inner shield 32, where the inner shield 32 protects an end of a sensing element 34. The sensing element 34 is partially surrounded by an insulator 36, which is press-fit into the base portion 30. Also partially surrounding the insulator 36 and the sensing element 34 is a second inner shield 38. The sensing element 34 is also partially surrounded by a second insulator 40, and the second insulator 40 is held in place by a support mount 42. Connected to the sensing element 34 are several wires 44, which are part of a wiring harness, shown generally at 46. The sensor 20 also includes a second housing portion 48 which is connected to the base portion 30 and the wiring harness 46, such that the second housing portion 48 surrounds various components of the sensor 20, as shown in FIG. 4B. Also connected to the base portion 30 is a mounting portion 50 having a threaded section, shown generally at 52.

Figure 2:
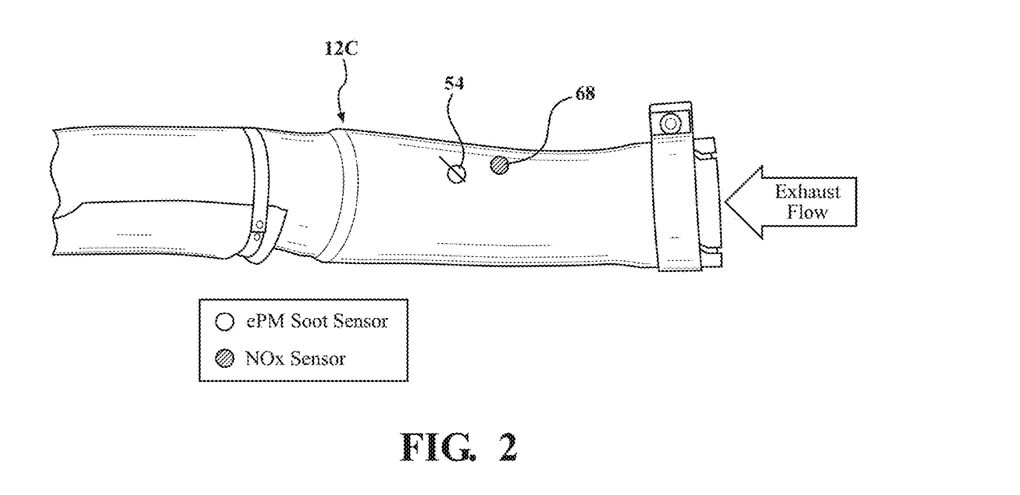
FIG. 2 is an enlarged perspective view of a portion of an exhaust system for a vehicle incorporating a dew point activation method for an exhaust sensor, according to embodiments of the present invention.

The threaded section 52 is used for mounting the sensor component 22 into an aperture 68 formed as part of the tail pipe 12C, shown in FIG. 2, such that the first housing portion 26, inner shield 32, a portion of the sensing element 34, and a portion of the base portion 30 are positioned inside the tail pipe 12C.

Figure 5A:
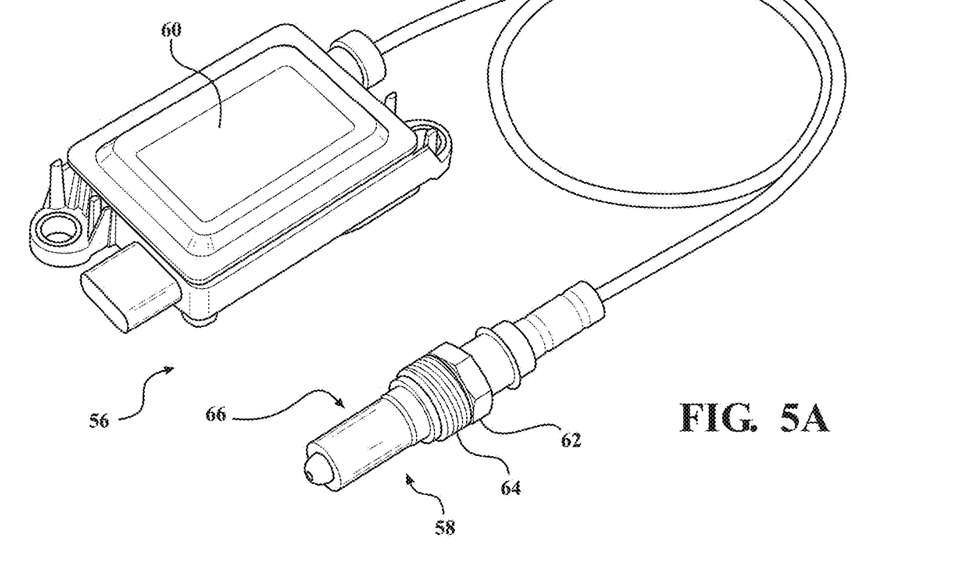
FIG. 5A is a perspective view of a particulate matter sensor assembly used as part of an exhaust system for a vehicle incorporating a dew point activation method for an exhaust sensor, according to embodiments of the present invention.
Figure 5B:
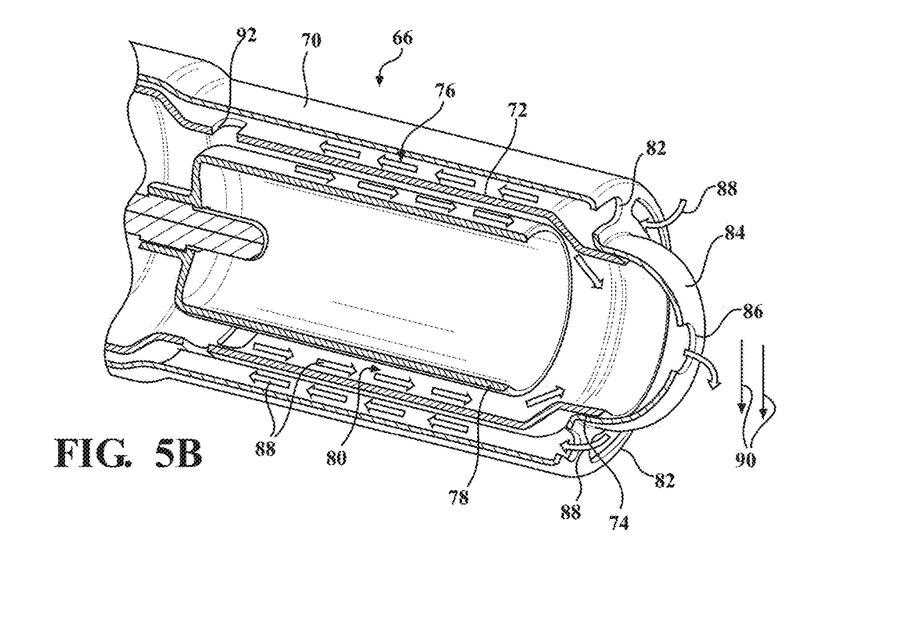
FIG. 5B is a sectional view of a sensor component which is part of a particulate matter sensor assembly used as part of an exhaust system for a vehicle incorporating a dew point activation method for an exhaust sensor, according to embodiments of the present invention.
Figure 5C:
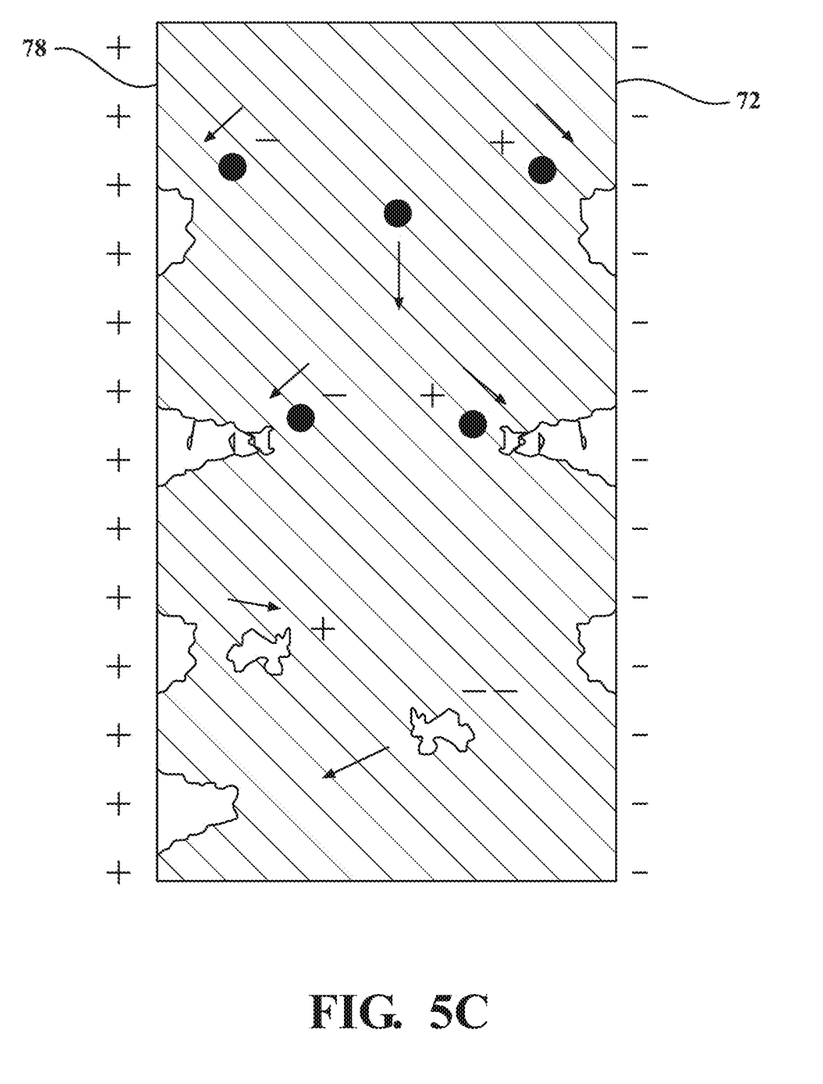
FIG. 5C is a pictorial view of the electrical phenomenon which occurs during the shorting of a particulate matter sensor assembly used as part of an exhaust system for a vehicle incorporating a dew point activation method for an exhaust sensor, according to embodiments of the present invention.

Referring to FIGS. 5A-5C, the exhaust system 10 also includes an electrostatic particulate matter (ePM) sensor, shown generally at 56. The ePM sensor 56 also includes a sensor component, shown generally at 58, connected to a control unit 60, where the control unit 60 is also in electrical communication with the ECU. The sensor component 58 also includes a mounting portion 62 which has a threaded portion 64, which is used for mounting the sensor component 58 to the tail pipe 12C, such that a portion, shown generally at 66, of the sensor component 58 is disposed in the tail pipe 12C. The sensor component 58 is mounted to the tail pipe 12C in an aperture 54 formed as part of the tail pipe 12C. The portion 66 of the sensor component 58 disposed in the tail pie 12C includes a housing 70, and disposed in the housing 70 is a baffle tube 72. There is a connection 74 between the housing 70 and the baffle tube 72 at an end of the housing 70, and there is also a cavity, shown generally at 76, between the housing 70 and the baffle tube 72. Disposed inside the baffle tube 72 is an electrode tube 78, and the electrode tube 78 is positioned such that there is a cavity, shown generally at 80, between the baffle tube 72 and electrode tube 78.

There are several outer flow apertures 82 formed as part of the housing 70, and the apertures 82 surround a venturi portion 84, where the venturi portion 84 includes a flow aperture 86, as shown in FIG. 5B. The flow of particulate matter into the sensor component 58 is represented by arrows 88, and the flow of exhaust gas across the tip of the sensor component 58 is represented by arrows 90. The exhaust gas flow 90 passes by the venturi portion 84, creating a vacuum inside the sensor component 58. More specifically, the vacuum generated causes particles to flow along the flow path, as shown by arrows 88, where the particulate matter particles (which are electrically charged) flow through the outer flow apertures 82 and into the cavity 76, through a plurality of side apertures 92 formed as part of the baffle tube 72, through the cavity 80, into the venturi portion 84, where the particles then flow through the flow aperture 86 and exit the venturi portion 84.

The cavity 80 acts as a measuring path along the outer wall of the electrode tube 78 (which is positively charged) and the inner wall of the baffle tube 72 (which is grounded). The particles in the exhaust gas are drawn to either the outer wall of the electrode tube 78 or the inner wall of the baffle tube 72, as shown in FIG. 5C.

Figure 3A:
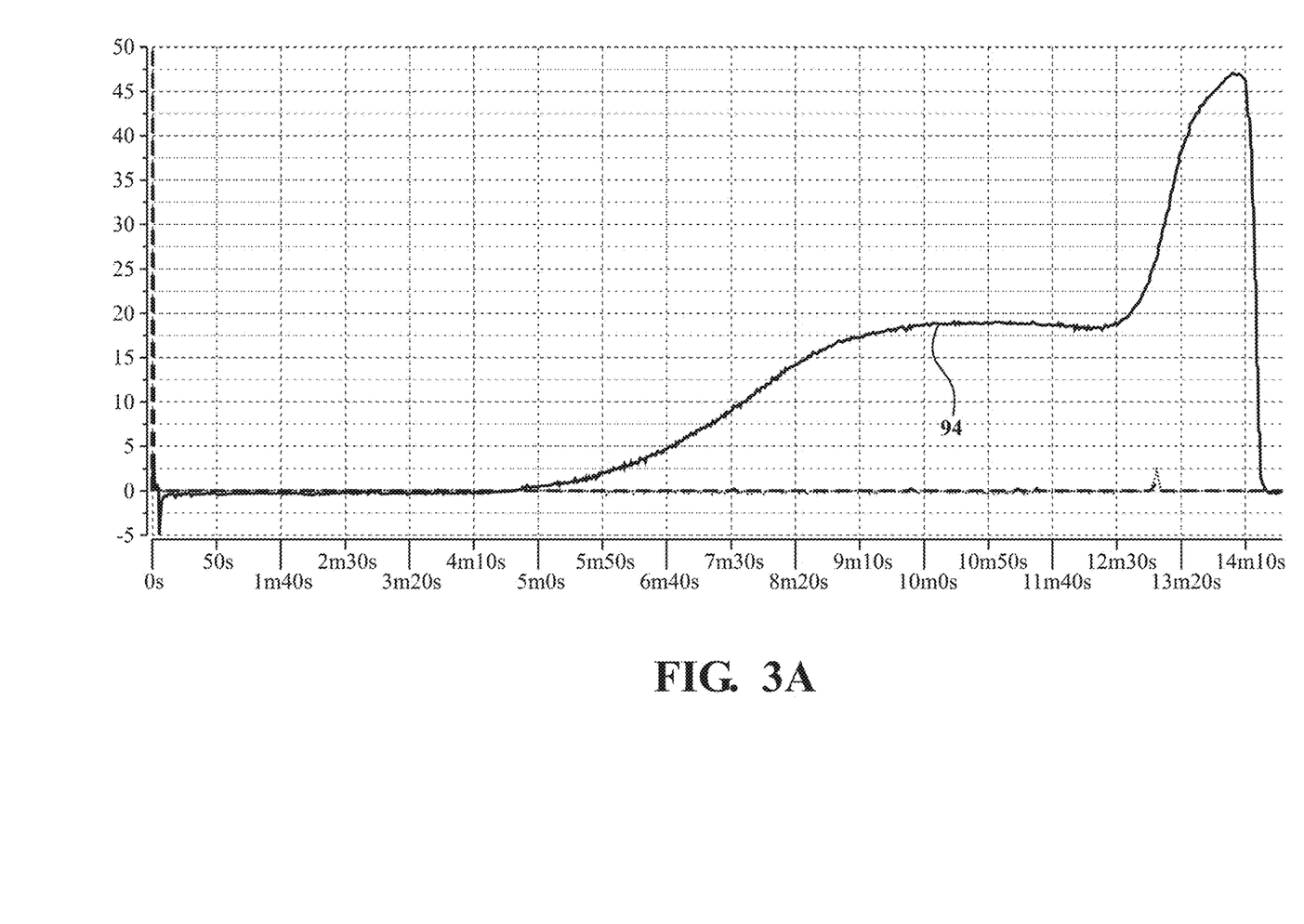
FIG. 3A is a graph depicting synchronized time signals of at least one measured parameter in an exhaust system using a dew point activation method for an exhaust sensor, according to embodiments of the present invention.

Referring now to FIG. 3A, an example of the output from the ePM sensor 56 is shown, which occurs during a cold start of a diesel vehicle equipped with the exhaust system 10 previously described, which uses a dew point activation method to activate the NOx sensor 20 according to embodiments of the present invention. FIG. 3A includes at least one measured parameter, including measured current 94. Within the exhaust system, the NOx sensor 20 is mounted near the ePM sensor 56 to assess and compare conditions of the exhaust flow. The measured current 94 in the ePM sensor 56 is shown in FIG. 3A, where the measured current 94 also depicts the shorting that occurs across the components of the ePM sensor 56 due to the presence of a substance, such as water.

Figure 3B:
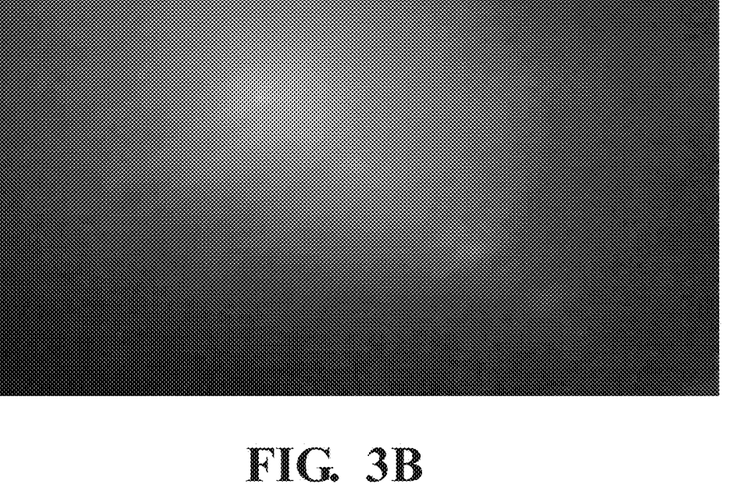
FIG. 3B is a view of the inside of a portion of an exhaust pipe having a cloud of water during cold-start activation of an exhaust system for a vehicle incorporating a dew point activation method for an exhaust sensor, according to embodiments of the present invention.
Figure 3C:
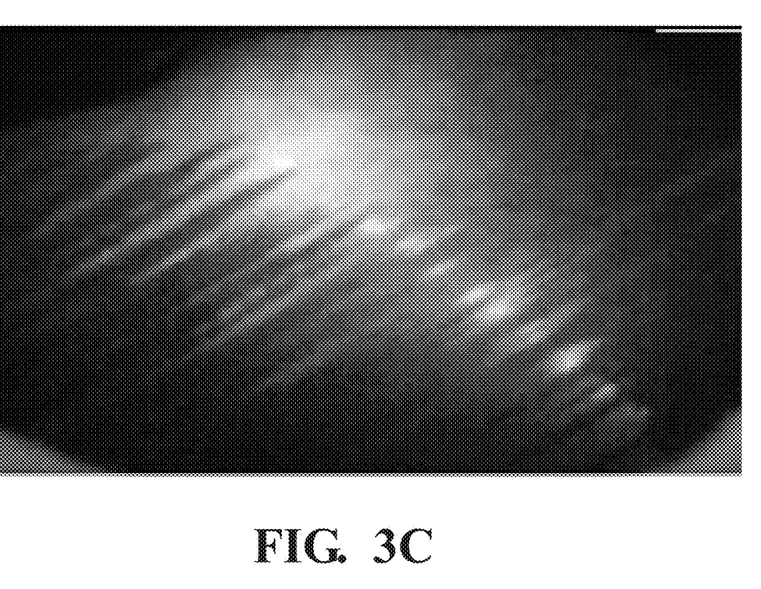
FIG. 3C is a view of the inside of a portion of an exhaust pipe after cold-start activation, and water has been removed, of an exhaust system for a vehicle incorporating a dew point activation method for an exhaust sensor, according to embodiments of the present invention.

When the vehicle is activated during a cold start condition, the current 94 that is measured increases, as shown in FIG. 3A, indicating the presence of water in the tail pipe 12C in proximity to the ePM sensor 56 and the NOx sensor 20, as shown in FIG. 3B, which depicts a water cloud in the exhaust gas flow. In this example, the shorting of the current 94 has occurred between five minutes and just after fourteen minutes, as shown in FIG. 3A. The presence of water along the measuring path in the cavity 80 generates the current 94, which is measurable, and is used to determine when the water evaporated, which is shown when the measurement of the current 94 is reduced. When the current 94 has decreased such that the current 94 is at or below a predetermined value, the shorting is no longer occurring in the ePM sensor 56. The predetermined value is typically when the current 94 generated by ePM sensor 56 is zero, or within some measurable threshold, typically approaching a zero threshold. Once the current 94 is at or below the predetermined value, water is no longer in the tail pipe 12C, as shown in FIG. 3C, and there is minimal risk of the NOx sensor 20 being exposed to thermal shock from water impingement. Therefore, the ePM sensor 56 may be used to determine when to activate the NOx sensor 20, without the risk of thermal shock from water impingement.

While it has been described above that that NOx sensor 20 and the ePM sensor 56 are mounted to the tail pipe 12C, it is within the scope of the invention that the sensors 20,56 may be mounted to other areas along the flow of exhaust gas. In alternate embodiments, the sensors may be mounted in proximity to other exhaust system components, such as an exhaust gas catalyst (for example to the DOC 14, or the SCR 16) or exhaust gas filter (for example the DPF 18).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exhaust system for a vehicle, comprising:
a first sensor operable for detecting current created by the flow of particles in exhaust gas; and
a nitrogen oxide sensor;
wherein the amount of a substance in the exhaust system changes the current detected by the first sensor, such that when the current detected by the first sensor is above a predetermined value, the substance is present in the exhaust system, and when the substance has been removed from the exhaust system, the current detected by the first sensor is at or below the predetermined value, and the nitrogen oxide sensor is activated when the current generated by the first sensor is at or below the predetermined value.

2. The exhaust system for a vehicle of claim 1, the first sensor further comprising a particulate matter sensor.

3. The exhaust system for a vehicle of claim 1, the substance further comprising water.

4. The exhaust system for a vehicle of claim 3, wherein the water has evaporated from the exhaust system when the current generated by the first sensor is below the predetermined value.

5. The exhaust system for a vehicle of claim 1, further comprising an exhaust pipe being part of the exhaust system, wherein at least a portion of the first sensor extends into the exhaust pipe, and at least a portion of the nitrogen oxide sensor extends into the exhaust pipe.

6. The exhaust system for a vehicle of claim 1, further comprising an exhaust gas catalyst being part of the exhaust system, wherein the first sensor and the nitrogen oxide sensor are mounted in proximity to the exhaust gas catalyst.

7. The exhaust system for a vehicle of claim 1, further comprising an exhaust gas filter being part of the exhaust system, wherein the first sensor and the nitrogen oxide sensor are mounted in proximity to the exhaust gas filter.

8. The exhaust system of claim 1, the predetermined value further comprising a measurable threshold.

9. A method for determining when to activate a sensor, comprising the steps of:
   providing an exhaust system for a vehicle;
   providing a first sensor being part of the exhaust system; and
   providing a NOx sensor being part of the exhaust system;
   measuring a current generated by the first sensor to detect the presence of a substance;
   detecting the presence of a substance in the exhaust system if the current generated by the first sensor is above a predetermined value;
   activating the NOx sensor once the current measured by the first sensor is at or below the predetermined value.

10. The method of claim 9, further comprising the steps of providing the first sensor to be an ePM sensor.

11. The method of claim 10, further comprising the steps of the ePM sensor generating the current above the predetermined value when the substance is in the exhaust system.

12. The method of claim 9, further comprising the steps of:
   providing the substance to be water;
   activating the NOx sensor once the current measured by the first sensor is at or below the predetermined valve, indicating that the water has evaporated from the exhaust system.

13. The method of claim 9, further comprising the steps of:
   providing an exhaust pipe being part of the exhaust system,
   mounting the first sensor to the exhaust pipe such that at least a portion of the first sensor extends into the exhaust pipe;
   mounting the NOx sensor to the exhaust pipe such that at least a portion of the NOx sensor extends into the exhaust pipe.

14. The method of claim 9, further comprising the steps of:
   providing an exhaust gas catalyst being part of the exhaust system;
   mounting the first sensor and the NOx sensor in proximity to the exhaust gas catalyst.

15. The method of claim 9, further comprising the steps of:
   providing an exhaust gas filter being part of the exhaust system;
   mounting the first sensor and the NOx sensor in proximity to the exhaust gas filter.

16. The method of claim 9, further comprising the steps of providing the predetermined value to be a measurable threshold.

* * * * *